(12) United States Patent
Boyle

(10) Patent No.: US 12,296,230 B2
(45) Date of Patent: May 13, 2025

(54) BIODEGRADABLE SPORTS BALL AND METHOD FOR MANUFACTURE THEREOF

(71) Applicant: Head Technology GmbH, Kennelbach (AT)

(72) Inventor: Martin Boyle, Litchfield Park, AZ (US)

(73) Assignee: Head Technology GmbH, Kennelbach (AT)

( * ) Notice: Subject to any disclaimer, the term of this patent is extended or adjusted under 35 U.S.C. 154(b) by 0 days.

(21) Appl. No.: 18/147,049

(22) Filed: Dec. 28, 2022

(65) Prior Publication Data

US 2024/0216762 A1 Jul. 4, 2024

(51) Int. Cl.
| | | |
|---|---|---|
| *A63B 39/08* | (2006.01) | |
| *A63B 102/02* | (2015.01) | |
| *C08L 7/00* | (2006.01) | |
| *C08L 9/00* | (2006.01) | |
| *D01F 4/00* | (2006.01) | |
| *D01F 6/60* | (2006.01) | |

(52) U.S. Cl.
CPC .............. *A63B 39/08* (2013.01); *C08L 7/00* (2013.01); *C08L 9/00* (2013.01); *D01F 4/00* (2013.01); *D01F 6/60* (2013.01); *A63B 2102/02* (2015.10); *A63B 2209/18* (2020.08); *C08L 2201/06* (2013.01); *D10B 2211/02* (2013.01); *D10B 2331/02* (2013.01)

(58) Field of Classification Search
CPC . A63B 39/08; A63B 2102/02; A63B 2209/18; C08L 2201/06
See application file for complete search history.

(56) References Cited

U.S. PATENT DOCUMENTS

| | | | | |
|---|---|---|---|---|
| 5,209,471 | A * | 5/1993 | Horiuchi | A63B 39/00 525/232 |
| 2006/0205534 | A1* | 9/2006 | Egashira | A63B 37/0074 473/378 |
| 2010/0276363 | A1* | 11/2010 | Hoyland | C02F 3/341 210/615 |
| 2017/0029582 | A1* | 2/2017 | Kuczynski | B29C 67/247 |
| 2017/0120497 | A1* | 5/2017 | Lin | B29C 48/17 |
| 2018/0264326 | A1* | 9/2018 | Simonutti | A63B 39/00 |
| 2020/0190289 | A1* | 6/2020 | Hyodo | A63B 39/02 |
| 2021/0128985 | A1* | 5/2021 | Simonutti | A63B 39/00 |
| 2022/0288813 | A1* | 9/2022 | Senior | B07B 1/06 |
| 2023/0271063 | A1* | 8/2023 | Price | C08L 9/00 473/606 |
| 2023/0348687 | A1* | 11/2023 | Quirk | C09K 17/00 |
| 2023/0405409 | A1* | 12/2023 | Burbary | A63B 39/00 |

FOREIGN PATENT DOCUMENTS

DE 202004012042 U1 * 11/2004 ......... A63B 37/0003

OTHER PUBLICATIONS

"Innescu Group: Products", <https://www.innescus.com/productos/>, Jan. 9, 2022, retrieved on Jun. 7, 2024. (Year: 2022).*
"Eco Logic: Eco-One EL10", <https://www.polychempremier.com/filesdirectserver/itp1/z_itp_2411202112hn/TDSEco-OneEL10-PEz-z1403537291320.pdf>, Jan. 16, 2019, retrieved on Jun. 7, 2024. (Year: 2019).*
Comprehensive Polymer Science and Supplements, "Biodegradable Polymers", <https://www.sciencedirect.com/science/article/pii/B9780080967011002317>, 1989, retrieved on Jun. 7, 2024. (Year: 1989).*
INNECSUS Group "Productos, Ecologic" <https://www.innecsus.com/productos/>, 5 pages, retrieved Dec. 22, 2022.

* cited by examiner

*Primary Examiner* — Steven B Wong
(74) *Attorney, Agent, or Firm* — Bookoff McAndrews, PLLC

(57) ABSTRACT

The invention relates to a sports ball comprising a rubber core and optionally a felt, the rubber core defining an internal volume and an outer surface, the felt being provided on the outer surface of the rubber core, and the rubber core comprising: natural and/or synthetic rubber; and a biodegradability-enabling additive comprising at least one organic compound in a carrier material, wherein the organic compound is a nutrient substrate for an active landfill or marine environment strain of bacteria. The invention further relates to a method for manufacturing a tennis ball including: a) mixing natural rubber and butadiene rubber with further ingredients and the biodegradability-enabling additive; b) extruding a portion of the mixture; c) utilizing the extruded portion for forming a shellpart; d) assembling a core by attaching at least two shellparts to each other; e) inflating the core; and f) providing a felt on the surface of the core.

20 Claims, No Drawings

BIODEGRADABLE SPORTS BALL AND METHOD FOR MANUFACTURE THEREOF

The invention relates to a sports ball comprising a rubber core and optionally a felt, the rubber core defining an internal volume and an outer surface, the felt being provided on the outer surface of the rubber core, and the rubber core comprising: natural and/or synthetic rubber; and a biodegradability-enabling additive; wherein the biodegradability-enabling additive comprises at least one organic compound in a carrier material, wherein the organic compound is a nutrient substrate for at least one active landfill or marine environment strain of bacteria. The invention further relates to a method for manufacturing a tennis ball including the following steps: a) mixing natural rubber and butadiene rubber with further ingredients and the biodegradability-enabling additive; b) extruding at least a portion of the mixture; c) utilizing the extruded portion for forming a shellpart; d) assembling a core by attaching at least two shellparts to each other; e) inflating the core; and f) providing a felt on the surface of the core.

Tennis is a global sport with more than 60 million players and about 200 affiliated nations. Tennis balls degrade with use and are replaced at regular intervals to maintain consistency and uniformity in performance. Ball performance is critical to players and spectators to enable high quality tennis. Typically, in professional tennis matches a set of six balls are in play at any given time. The first set of balls is used for the warm-up and the first seven games, with ball exchanges every nine games thereafter. Each year approximately 325 million tennis balls are produced, which contributes roughly 20,000 tonnes of waste that is not easily biodegradable. It is estimated that the decomposition of a standard tennis ball requires 400 years.

Thus, there is a need for improved and biodegradable sports balls, such as tennis balls.

The above technical problem is solved by the embodiments disclosed herein and as defined in the claims.

Accordingly, the invention relates to, inter alia, the following embodiments:

1. A tennis ball comprising a rubber core and a felt, the rubber core defining an internal volume and an outer surface, the felt being provided on the outer surface of the rubber core, and the rubber core comprising:
   natural and/or synthetic rubber; and
   a biodegradability-enabling additive;
   wherein the biodegradability-enabling additive comprises at least one organic compound in a carrier material, wherein the organic compound is a nutrient for at least one active landfill or marine environment strain of bacteria.
2. The tennis ball according to embodiment 1, wherein the carrier material is a resin.
3. The tennis ball according to embodiment 1 or 2, wherein the at least one organic compound comprises lipids, proteins and nucleic acids.
4. The tennis ball according to any one of embodiments 1 to 3, wherein the biodegradability-enabling additive enhances the air retention performance of the tennis ball at least about 5%, at least about 10%, at least about 15% or at least about 20% in the 60 minute air cannon test.
5. The tennis ball according to any one of embodiments 1 to 4, wherein the carrier material and the organic compound are at least 80 weight-%, at least 85 weight-% or at least 90 weight-%, of the biodegradability-enabling additive.
6. The tennis ball according to any one of embodiments 1 to 5, wherein the active landfill or marine environment bacteria is at least one strain selected from the group consisting of: Gammaproteobacteria, Firmicutes and Bacteriaoidetes.
7. The tennis ball according to embodiment 6, wherein the biodegradability-enabling additive accelerates the full bio-assimilation of the tennis ball to less than 4 years according to the ASTM 5511 standard upon being in contact with the strain of bacteria.
8. The tennis ball according to any one of embodiment 1 to 7, wherein the rubber core comprises 0.1-5 weight-%, preferably 0.5-2.5 weight-%, more preferably 1-2 weight-% of the biodegradability-enabling additive.
9. The tennis ball according to embodiment 8, wherein the rubber core comprises one or a combination of the following ingredients, wherein all percentages are based on weight:
   26.0-30.0% natural rubber,
   4.0-6.0% butadiene rubber,
   3.0-4.0% felt edge dipping glue recycle,
   8.0-12.0% rubber powder and dust collector powder recycle,
   12.0-14.0% kaolin clay,
   5.0-7.0% silicon dioxide,
   7.0-9.0% barium sulfate,
   12.0-16.0% calcium carbonate,
   0.50-1.50% zinc oxide,
   0.50-0.80% stearic acid,
   0.05-0.15% diphynyl guanidine,
   0.10-0.30% dibenzothiazole disulfide,
   0.50-0.80% benzothiazole sulfonamide,
   1.50-3.50% sulphur.
10. The tennis ball according to any of the preceding embodiments, wherein the felt also comprises the biodegradability-enabling additive.
11. The tennis ball according to embodiment 10, wherein the felt comprises 0.1-5 weight-% biodegradability-enabling additive per percentage nylon, preferably 0.5-2.5 weight-% biodegradability-enabling additive per percentage nylon.
12. The tennis ball according to embodiment 10 or 11, wherein the felt comprises 40-90 weight-% wool and 5 to 50% nylon.
13. A method for manufacturing a tennis ball, preferably a tennis ball according to any of the preceding embodiments, including the following steps:
   a) mixing natural rubber and butadiene rubber with further ingredients and a biodegradability-enabling additive, wherein the biodegradability-enabling additive comprises at least one organic compound in a carrier material, wherein the organic compound is a nutrient for at least one active landfill or marine environment strain of bacteria;
   b) extruding at least a portion of the mixture;
   c) utilizing the extruded portion for forming a shellpart;
   d) assembling a core by attaching at least two shellparts to each other;
   e) inflating the core; and
   f) providing a felt on the surface of the core.
14. The method according to embodiment 13, wherein one or more of the following ingredients are mixed in the mixing step, wherein all percentages are based on weight:
   26.0-30.0% natural rubber,
   4.0-6.0% butadiene rubber,
   3.0-4.0% felt edge dipping glue recycle, 8.0-12.0% rubber powder and dust collector powder recycle,
12.0-14.0% kaolin clay,
5.0-7.0% silicon dioxide,
7.0-9.0% barium sulfate,
12.0-16.0% calcium carbonate,
1.50-2.50% biodegradability-enabling additive,
0.50-1.50% zinc oxide,
0.50-0.80% stearic acid,
0.05-0.15% diphynyl guanidine,
0.10-0.30% dibenzothiazole disulfide,
0.50-0.80% benzothiazole sulfonamide,
1.50-3.50% sulphur.

15. The method according to embodiment 13 or 14, wherein mixing is performed at a temperature between 110 and 120° C.
16. The method according to any of embodiments 13 to 15, wherein the extruded portion has weight between 22 and 28 g and/or wherein the temperature of during extrusion is smaller than 110° C., preferably wherein the extruded portion has weight between 24 and 26 g.
17. The method according to any of embodiments 13 to 16, wherein the curing mold temperature during forming of the half shell in the mold amounts to 155 to 170° C., preferably wherein curing takes 90 to 110 s.
18. The method according to any of embodiments 13 to 17, wherein the edges of the half shells are buffed before assembling the core.
19. The method according to any of embodiments 13 to 18, wherein the two half shells are attached to each other by means of adhesive.
20. The method according to any of embodiments 13 to 19, wherein assembling the core is performed in a curing mold having a temperature of 150 to 170° C., preferably wherein curing takes 110 to 130 s.
21. The method according to any of embodiments 13 to 20, wherein the core is inflated to a pressure between 18 and 20 psi.

Accordingly, in one embodiment, the invention relates to a sports ball comprising or consisting of a rubber material, the rubber material comprising: natural and/or synthetic rubber; and a biodegradability-enabling additive; wherein the biodegradability-enabling additive comprises at least one organic compound in a carrier material, wherein the organic compound is a nutrient for at least one active landfill or marine environment strain of bacteria.

The "sports ball", as used herein, refers to any sports ball having sufficient rebound and adequate dimensions to be used in sports. In some embodiments, the sports ball described herein is a racket sports ball. In some embodiments, the racket sports described herein is at least one racket sports selected from the group consisting of ball badminton, frontenis, qianball, racketlon, rackets, racquetball, real tennis, road tennis, soft tennis, speed-ball, squash, hardball squash, squash tennis, stické, tennis, tennis polo, and lawn tennis.

In some embodiments, the rubber material described herein is a rubber core defining an internal volume and an outer surface.

In certain embodiments, the invention relates to a tennis ball comprising a rubber core and a felt, the rubber core defining an internal volume and an outer surface, the felt being provided on the outer surface of the rubber core, and the rubber core comprising: natural and/or synthetic rubber; and a biodegradability-enabling additive;
wherein the biodegradability-enabling additive comprises at least one organic compound in a carrier material, wherein the organic compound is a nutrient for at least one active landfill or marine environment strain of bacteria.

The inventors surprisingly found that biodegradability-enabling additives for improving biodegradability of sports balls such as tennis balls also enhance performance properties of the sports balls.

The term "tennis ball", as used herein refers to any ball suitable for the sport of tennis. In some embodiments, the tennis ball described herein is a tennis ball having a diameter of 6.54-6.86 cm and a mass in the range 56.0-59.4 g. In some embodiments, the tennis ball is pressured or unpressured. In some embodiments, the tennis ball described herein is a tennis ball according to the International Tennis Federation criteria.

The term "rubber core", as used herein refers to a core of the sports ball that enables rebound and/or bounce performance and typically is spherical hollow core.

The term "felt" as used herein refers to the outer layer of the sports ball such as the tennis ball, typically a fiber material adhered to the rubber core. The felt may comprise woven fiber material or needle punched felt. Felt may comprise natural fiber (such as wool), synthetic fiber (such as nylon) or a mixture thereof. In certain embodiments, the felt may comprise a needle-punched felt comprising fiber having a wool content of 70% and a nylon content of 30%. The needle punched felt may have a high level of elongation. For example, the felt can have a diagonal direction elongation of greater than 12% under an applied load of five psi. In other embodiments, other mixtures of natural and synthetic fibers can be used. In other implementations, felts having other elongation values can be used.

The term "organic compound", as used herein refers to any chemical compound of carbon (excluding carbon monoxide, carbon dioxide, carbonic acid, metallic carbides, metallic carbonates and ammonium carbonate) or plurality of chemical compounds that can serve as a nutrient for at least one active landfill or marine environment strain of bacteria. In some embodiments, the organic compound is a naturally occurring compound or a component thereof. In some embodiments, the organic compound provides a bacterially usable source of at least one selected from the group consisting of nitrogen, phosphorus, and sulfur, preferably nitrogen. In some embodiments, the organic compound comprises lipids, proteins and/or nucleic acids. In some embodiments, the organic compound accelerates colonialization of the of the sports ball by active landfill or marine environment strain of bacteria, e.g., it accelerates colonialization of the sports ball by at least one strain of Gammaproteobacteria, Firmicutes and/or Bacteriaoidetes on a landfill or in marine environment. In some embodiments, the organic compound enables an increased colonialization of the sports ball by the active landfill or marine environment strain of bacteria.

The term "biodegradability-enabling additive", as used herein, refers to a combination of compounds which accelerates the bacteria-mediated biodegradability of the sports ball (e.g. tennis ball) or parts thereof and comprises at least one organic compound and a carrier material. As such the organic compound improves the availability of nutritional components to improve bacterial colonialization and/or growth. Typically, the bacteria colonize on the surface of the sports ball which in turn creates a hydrolysis which is the start of opening polymer chains. In some embodiments, the biodegradability-enabling additive is a powder before the production of the sports ball. The organic compound is preferably integrated in the carrier material, such that the organic compound is available to bacteria after disposal of the sports ball (e.g. tennis ball), e.g., in a landfill. Preferably the carrier material is able to conserve the organic compound at least partially over the expected utility duration of the sports ball. Typically, the organic compound is distributed such that it enables accelerated colonialization of the active landfill or marine environment strain of bacteria. In some embodiments, the organic compound is encapsulated in the carrier material.

The term "active landfill or marine environment strain of bacteria", as used herein, refers to any strain of bacteria that enables, increases or supports degradation (e.g. enzymatic or mechanic degradation) of sports ball (e.g. tennis ball) components in a landfill or marine environment. In some embodiments, the active landfill or marine environment strain of bacteria is a strain comprised in at least one selected from the group consisting of Fusobacteria, Tenericutes, Gammaproteobacteria, Firmicutes and Bacteriaoidetes.

The inventors found that biodegradability-enabling additives for improving biodegradability of sports balls, such as tennis balls, surprisingly also enhance ball performance such as forward deformation and/or air retention. These biodegradability-enabling additives are added to facilitate bacteria supported biodegradability. This ensures that the biodegradation only starts when in active landfill or marine environment. As such, the sports balls, such as tennis balls, having the ingredients described herein are more environment friendly and are beneficial for sports performance.

Accordingly, the invention is at least in part based on the finding that biodegradability-enabling additives can improve sports balls as described herein.

In certain embodiments, the invention relates to the sports ball (e.g. tennis ball) according to the invention, wherein the carrier material is a resin.

Accordingly, the invention is at least in part based on the finding that resin can conserve the organic compounds particularly effective.

In certain embodiments, the invention relates to the sports ball (e.g. tennis ball) according to the invention, wherein the at least one organic compound comprises lipids, proteins and nucleic acids.

The inventors found that lipids, proteins and nucleic acids are particularly effective in enhancing sports ball performance properties during the utility lifespan of the sports ball and bacteria-supported degradation after the utility lifespan of the sports ball.

In certain embodiments, the invention relates to the sports ball (e.g. tennis ball) according to the invention, wherein the at least one organic compound comprises or consists of Eco-One EX112.

Eco-One EX112 is a product developed for improving degradation of polyurethane (see e.g., "Eco-One EX112" on https://www.innecsus.com/productos/ retrieved Aug. 4, 2022). The inventors surprisingly found that Eco-One EX112 is also effective in improving bacteria-supported degradation of rubber.

Accordingly, the invention is at least in part based on the finding that Eco-One EX112 can be used to improve degradation of sports balls as described herein.

In certain embodiments, the invention relates to the sports ball (e.g. tennis ball) according to the invention, wherein the biodegradability-enabling additive enhances the air retention performance of the sports ball at least about 5%, at least about 10%, at least about 15%, at least about 20%, at least about 30%, at least about 40%, or at least 50% in a 60 minute air cannon test.

The inventors found that the biodegradability-enabling additive reduces the pressure reduction after the air cannon test. The term "air retention performance", as used herein refers to the % improvement in pressure loss compared to the pressure loss of a reference ball, wherein the reference ball is an equivalent ball not comprising the biodegradability-enabling additive. For example, a 50% improvement (i.e. 0.5 psi loss post testing) compared to a 1 psi loss post air cannon testing is considered an air retention performance enhancement of 50%.

The air cannon test is typically more severe than what players would hit a ball, e.g., in court and can be considered a performance and durability test for sports balls. An more stable pressure is beneficial for the stability of the ball performance. Furthermore, sports balls are often disposed once they partially lose their pressure and bounce. A slowed pressure release therefore also extends the longevity of the ball and reduces waste. Accordingly the invention is at least in part based on the finding that the biodegradability-enabling additive can improve performance, reduce waste and enhance degradability.

In some embodiments, the performance of the sports ball (e.g. tennis ball) is measured by an air retention test such as the air cannon test described in the examples section. In some embodiments, the performance of the sports ball (e.g. tennis ball) is measured by a drop test such as the International Tennis Federation drop test.

The biodegradability-enabling additive may comprise further components than the carrier material and the organic compound, e.g., adjuvants that facilitate steps of the manufacturing process such as homogenous distribution in the sports ball (e.g. tennis ball). Such adjuvants are typically a minor portion of the biodegradability-enabling additive.

In certain embodiments, the invention relates to the sports ball (e.g. tennis ball) according to the invention, wherein the carrier material and the organic compound are at least 80 weight-%, at least 85 weight-% or at least 90 weight-%, of the biodegradability-enabling additive.

In certain embodiments, the invention relates to the sports ball (e.g. tennis ball) according to the invention, wherein the active landfill or marine environment bacteria is at least one strain selected from the group consisting of: Gammaproteobacteria, Firmicutes and Bacteriaoidetes.

In certain embodiments, the invention relates to the sports ball (e.g. tennis ball) according to the invention, wherein the active landfill or marine environment bacteria is at least one strain from Gammaproteobacteria.

In certain embodiments, the invention relates to the sports ball (e.g. tennis ball) according to the invention, wherein the active landfill or marine environment bacteria is at least one strain from Firmicutes.

In certain embodiments, the invention relates to the sports ball (e.g. tennis ball) according to the invention, wherein the active landfill or marine environment bacteria is at least one strain from Bacteriaoidetes.

Gammaproteobacteria, Firmicutes and Bacteriaoidetes are the most common bacteria on landfills. Enhancement of the effect of these bacteria is particularly useful for efficient biodegradation.

In certain embodiments, the invention relates to the sports ball (e.g. tennis ball) according to the invention, wherein the biodegradability-enabling additive accelerates the full bioassimilation of the sports ball to less than 40 years, less than 20 years, less than 10 years, less than 8 years, less than 6 years or less than 4 years according to the ASTM 5511 standard upon being in contact with the strain of bacteria.

The term "full bio-assimilation", as used herein, refers to reduction of the majority of the components (e.g. more than 50%, more than 80% or more than 90%) of the sports ball to a molecular weight that can be consumed by microorganisms.

In certain embodiments, the invention relates to the sports ball (e.g. tennis ball) according to the invention, wherein the rubber core comprises 0.1-5 weight-%, preferably 0.5-2.5 weight-%, more preferably 1-2 weight-% of the biodegradability-enabling additive.

In certain embodiments, the invention relates to the sports ball (e.g. tennis ball) according to the invention, wherein the rubber core comprises one, a combination or all of the following ingredients, wherein all percentages are based on weight: 30.0-36.0% rubber (synthetic and/or natural), 11.0-16.0% recycling material, 36.5-47.5% minerals, 0.50-0.80% fatty acid, 2%-5% sulfurous compounds, preferably 2.15%-4.75% sulfurous compounds.

In certain embodiments, the invention relates to the sports ball (e.g. tennis ball) according to the invention, wherein the rubber core comprises one, a combination or all of the following ingredients, wherein all percentages are based on weight: 26.0-30.0% natural rubber, 4.0-6.0% butadiene rubber, 3.0-4.0% felt edge dipping glue recycle, 8.0-12.0% rubber powder and dust collector powder recycle, 12.0-14.0% kaolin clay, 5.0-7.0% silicon dioxide, 7.0-9.0% barium sulfate, 12.0-16.0% calcium carbonate, 0.50-1.50% zinc oxide, 0.50-0.80% stearic acid, 0.05-0.15% diphynyl guanidine, 0.10-0.30% dibenzothiazole disulfide, 0.50-0.80% benzothiazole sulfonamide, 1.50-3.50% sulphur.

In certain embodiments, the invention relates to the tennis ball according to the invention wherein the felt also comprises the biodegradability-enabling additive.

The inventors found that adding the biodegradability-enabling additive to the felt as well not only improves bacteria-mediated degradation of the felt, but also improves bacterial access to the surface of the core. As such the additional presence of the biodegradability-enabling additive in the felt unexpectedly accelerates the degradation of the sports ball.

The term "felt edge dipping glue recycle", as used herein, refers to a material that can be obtained by collection of the felt edge dipping process. In some embodiments, the felt edge dipping glue recycle is replaced or partially replaced by a non-recycle equivalent.

The term "rubber powder and dust collector powder recycle", as used herein, refers to a recycle material collected from a mixing and buffing process. In some embodiments, the rubber powder and dust collector powder recycle is replaced or partially replaced by a non-recycle equivalent.

In certain embodiments, the invention relates to the tennis ball according to the invention, wherein the felt comprises 0.1-5 weight-% biodegradability-enabling additive per percentage nylon.

In certain embodiments, the invention relates to the tennis ball according to the invention, wherein the felt comprises 0.5-2.5 weight-% biodegradability-enabling additive per percentage nylon.

The inventors found, that adding the same or a similar biodegradability-enabling additive to core and felt, enables improved bacterial colonialization and subsequently accelerated degradation.

In certain embodiments, the invention relates to the tennis ball according to the invention, wherein the felt comprises 40-90 weight-% wool and 5 to 50% nylon.

In certain embodiments, the invention relates to a method for manufacturing a tennis ball, preferably a tennis ball according to the invention, including the following steps: a) mixing rubber and with a biodegradability-enabling additive and optionally further ingredients, wherein the biodegradability-enabling additive comprises at least one organic compound in a carrier material, wherein the organic compound is a nutrient for at least one active landfill or marine environment strain of bacteria; b) extruding at least a portion of the mixture; c) utilizing the extruded portion for forming a shellpart; d) assembling a core by attaching at least two shellparts to each other; e) inflating the core; and f) providing a felt on the surface of the core.

In certain embodiments, the invention relates to a method for manufacturing a tennis ball, preferably a tennis ball according to the invention, including the following steps: a) mixing natural rubber and butadiene rubber with further ingredients and a biodegradability-enabling additive, wherein the biodegradability-enabling additive comprises at least one organic compound in a carrier material, wherein the organic compound is a nutrient for at least one active landfill or marine environment strain of bacteria; b) extruding at least a portion of the mixture; c) utilizing the extruded portion for forming a shellpart; d) assembling a core by attaching at least two shellparts to each other; e) inflating the core; and f) providing a felt on the surface of the core.

Accordingly, the invention is at least in part based on the finding that the method described herein enables the manufacture of biodegradable tennis balls with improved properties.

In certain embodiments, the invention relates to the method according to the invention, wherein one or more or all of the following ingredients are mixed in the mixing step, wherein all percentages are based on weight: 30.0-36.0% rubber (synthetic and/or natural), 11.0-16.0% recycling material, 36.5-47.5% minerals, 0.50-0.80% fatty acid, 2%-4.5% sulfurous compounds.

In certain embodiments, the invention relates to the method according to the invention, wherein one or more or all of the following ingredients are mixed in the mixing step, wherein all percentages are based on weight: 26.0-30.0% natural rubber, 4.0-6.0% butadiene rubber, 3.0-4.0% felt edge dipping glue recycle, 8.0-12.0% rubber powder and dust collector powder recycle, 12.0-14.0% kaolin clay, 5.0-7.0% silicon dioxide, 7.0-9.0% barium sulfate, 12.0-16.0% calcium carbonate, 1.50-2.50% biodegradability-enabling additive, 0.50-1.50% zinc oxide, 0.50-0.80% stearic acid, 0.05-0.15% diphynyl guanidine, 0.10-0.30% dibenzothiazole disulfide, 0.50-0.80% benzothiazole sulfonamide, 1.50-3.50% sulphur.

In certain embodiments, the invention relates to the method according to the invention, wherein mixing is performed at a temperature is below 130° C., preferably between about 110 and about 120° C.

In certain embodiments, the invention relates to the method according to the invention, wherein mixing is performed at a temperature between about 110 and about 120° C., wherein the mixing time is between about 330 s and about 360 s.

In certain embodiments, the invention relates to the method according to the invention, wherein the extruded portion has weight between about 22 and about 28 g, and/or wherein the temperature of during extrusion is smaller than about 110° C., preferably wherein the extruded portion has weight between about 24 and about 26 g.

In certain embodiments, the invention relates to the method according to the invention, wherein the curing mold temperature during forming of the half shell in the mold amounts to about 155 to about 170° C.

In certain embodiments, the invention relates to the method according to the invention, wherein the curing mold temperature during forming of the half shell in the mold amounts to about 155 to about 170° C., wherein curing takes about 90 to about 110 s.

In certain embodiments, the invention relates to the method according to the invention, wherein the edges of the half shells are buffed before assembling the core.

In certain embodiments, the invention relates to the method according to the invention, wherein the two half shells are attached to each other by means of adhesive.

In certain embodiments, the invention relates to the method according to the invention, wherein assembling the core is performed in a curing mold having a temperature of about 150 to about 170° C.

In certain embodiments, the invention relates to the method according to the invention, wherein assembling the core is performed in a curing mold having a temperature of about 150 to about 170° C. wherein curing takes about 110 to about 130 s. In certain embodiments, the invention relates to the method according to the invention, wherein the core is inflated to a pressure between about 18 and about 20 psi.

The words "a," "an," and "the" are used herein to refer to one or to more than one (i.e., to at least one, or to one or more) of the grammatical object of the article.

The word "or" should be understood to mean either one, both, or any combination thereof of the alternatives.

The term "and/or" should be understood to mean either one, or both of the alternatives. Throughout this specification, unless the context requires otherwise, the words "comprise", "comprises" and "comprising" will be understood to imply the inclusion of a stated step or element or group of steps or elements but not the exclusion of any other step or element or group of steps or elements.

The terms "include" and "comprise" are used synonymously. The term "preferably" means one option out of a series of options not excluding other options. The term "e.g." means one example without restriction to the mentioned example. By "consisting of" is meant including, and limited to, whatever follows the phrase "consisting of."

The terms "about" or "approximately", as used herein, refer to "within 20%", more preferably "within 10%", and even more preferably "within 5%", of a given value or range.

Reference throughout this specification to "one embodiment", "an embodiment", "a particular embodiment", "a related embodiment", "a certain embodiment", "an additional embodiment", "some embodiments", "a specific embodiment" or "a further embodiment" or combinations thereof means that a particular feature, structure or characteristic described in connection with the embodiment is included in at least one embodiment of the present invention. Thus, the appearances of the foregoing phrases in various places throughout this specification are not necessarily all referring to the same embodiment. Furthermore, the particular features, structures, or characteristics may be combined in any suitable manner in one or more embodiments. It is also understood that the positive recitation of a feature in one embodiment may serve as a basis for excluding the feature in another particular embodiment.

Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

The general methods and techniques described herein may be performed according to conventional methods well known in the art and as described in various general and more specific references that are cited and discussed throughout the present specification unless otherwise indicated. See e.g. Sissler, L. (2012). Advanced modelling and design of a tennis ball (Doctoral dissertation, Loughborough University).

EXAMPLES

Example 1

Two types of tennis balls were produced having the following ingredients:

TABLE 1

Table of Ingredients:

| Ingredient | Suitable % Weight ranges |
| --- | --- |
| Natural Rubber | 26.0-30.0 |
| Butadiene Rubber | 4.0-6.0 |
| Felt edge dipping glue recycle | 3.0-4.0 |
| Rubber Powder and Dust collector powder recycle | 8.0-12.0 |
| Kaolin Clay | 12.0-14.0 |
| Silicon Dioxide | 5.0-7.0 |
| Barium Sulfate | 7.0-9.0 |
| Calcium Carbonate | 12.0-16.0 |
| With or without Eco-One EX112 | 1.00-2.00 |
| Zinc Oxide | 0.50-1.50 |
| Stearic Acid | 0.50-0.80 |
| Diphynyl guanidine | 0.05-0.15 |
| Dibenzothiazole disulfide | 0.10-0.30 |
| Benzothiazole sulfenamide | 0.50-0.80 |
| Sulphur | 1.50-3.50 |

The tennis balls were produced according to the following method:

1) Mixing:

Initial stage mixing with Natural and Butadiene rubber incorporated with mineral fillers, Recycle materials, Eco one EX112 and other chemicals.

The heat built during mixing is 110-120° C.

2) Extrusion (Slug)

Make compound into cylindrical shape with the weight 24.0-26.0 g.

Slug temperature was not over 110° C.

3) $1^{st}$ cure (Half shell)

The process of forming a half shell. Curing mold temperature 155-170° C. at 90-110 seconds.

4) Half shell buffing & Cementing

To buff half shell edge then apply with adhesive.

Adhesive weight pick-up 0.10-0.50 g.

5) $2^{nd}$ cure (Core)

The process of assemble two half shell and air inflation.

Curing mold temperature 150-170° C. at 110-130 seconds.

Core internal pressure 18-20 psi.

The resulting tennis ball have the following properties:

TABLE 2

Tennis ball properties

| | Tennis ball with Eco-One EX112 | Tennis ball without Eco-One EX112 |
|---|---|---|
| Mass: [grams] | 56.45-57.35 | 56.72-57.15 |
| Size: [Inch] | 2.670-2.675 | 2.651-2.611 |
| Pressure prior to 60 minutes air cannon test | 12 psi | 12 psi |
| Pressure prior after 60 minutes air cannon test | 11.5 psi | 11 psi |
| Forward deformation: [Inch] | 0.274-0.277 | 0.269-0.273 |
| Rebound: [Inch] | 54.44-54.81 | 54.67-55.15 |

Air retention in the core after 60 minutes air cannon test was measured by an air cannon that fires balls onto a rigid surface at approximately 90°. The air cannon fires the tennis ball out of the cannon at a speed range of 130-135 feet per second it then hits a steel plate and returns back into the cannon. 8 Balls were tested per one hour test and each ball got 240 hits.

The full bio-assimilation the tennis ball with Eco-One EX112 was 3.16 years for the core and felt 2.45 years tested according to the ASTM 5511 standard.

The invention claimed is:

1. A tennis ball comprising a rubber core and a felt, the rubber core defining an internal volume and an outer surface, the felt being provided on the outer surface of the rubber core, and the rubber core comprising:
   natural and/or synthetic rubber; and
   a biodegradability-enabling additive in an amount between 0.1 weight-% and 5 weight-% of the rubber core;
   wherein the biodegradability-enabling additive comprises at least one organic compound in a carrier material, wherein the organic compound is a nutrient for at least one active landfill or marine environment strain of bacteria.

2. The tennis ball according to claim 1, wherein the carrier material is a resin.

3. The tennis ball according to claim 1, wherein the at least one organic compound comprises lipids, proteins and nucleic acids.

4. The tennis ball according to claim 1, wherein the biodegradability-enabling additive enhances the air retention performance of the tennis ball at least 5%, at least 10%, at least 15% or at least 20% in a 60 minute air cannon test.

5. The tennis ball according to claim 1, wherein the carrier material and the organic compound are at least 80 weight-%, at least 85 weight-% or at least 90 weight-%, of the biodegradability-enabling additive.

6. The tennis ball according to claim 1, wherein the active landfill or marine environment bacteria is at least one strain selected from the group consisting of: Gammaproteobacteria, Firmicutes and Bacteriaoidetes.

7. The tennis ball according to claim 6, wherein the biodegradability-enabling additive accelerates the full bio-assimilation of the tennis ball to less than 4 years according to the ASTM 5511 standard upon being in contact with the strain of bacteria.

8. The tennis ball according to claim 1, wherein the rubber core comprises 0.1-5 weight-% of the biodegradability-enabling additive.

9. The tennis ball according to claim 8, wherein the rubber core comprises one or a combination of the following ingredients, wherein all percentages are based on weight:
   26.0-30.0% natural rubber,
   4.0-6.0% butadiene rubber,
   3.0-4.0% felt edge dipping glue recycle,
   8.0-12.0% rubber powder and dust collector powder recycle,
   12.0-14.0% kaolin clay,
   5.0-7.0% silicon dioxide,
   7.0-9.0% barium sulfate,
   12.0-16.0% calcium carbonate,
   0.50-1.50% zinc oxide,
   0.50-0.80% stearic acid,
   0.05-0.15% diphynyl guanidine,
   0.10-0.30% dibenzothiazole disulfide,
   0.50-0.80% benzothiazole sulfonamide,
   1.50-3.50% sulphur.

10. The tennis ball according to claim 1, wherein the felt also comprises the biodegradability-enabling additive.

11. The tennis ball according to claim 10, wherein the felt comprises nylon and 0.1-5 weight-% biodegradability-enabling additive per percentage nylon.

12. The tennis ball according to claim 10, wherein the felt comprises 40-90 weight-% wool and 5 to 50% nylon.

13. A method for manufacturing a tennis ball, comprising:
   a) mixing natural rubber and butadiene rubber with further ingredients and a biodegradability-enabling additive, wherein the biodegradability-enabling additive comprises at least one organic compound in a carrier material, wherein the organic compound is a nutrient for at least one active landfill or marine environment strain of bacteria;
   b) extruding at least a portion of the mixture;
   c) utilizing the extruded portion for forming a shellpart;
   d) assembling a core by attaching at least two shellparts to each other;
   e) inflating the core; and
   f) providing a felt on the surface of the core;
   wherein the rubber core comprises between 0.1 weight-% and 5 weight-% of the biodegradability-enabling additive.

14. The method according to claim 13, wherein one or more of the following ingredients are mixed in the mixing step, wherein all percentages are based on weight:
   26.0-30.0% natural rubber,
   4.0-6.0% butadiene rubber,
   3.0-4.0% felt edge dipping glue recycle,
   8.0-12.0% rubber powder and dust collector powder recycle,
   12.0-14.0% kaolin clay,
   5.0-7.0% silicon dioxide,
   7.0-9.0% barium sulfate,
   12.0-16.0% calcium carbonate,
   1.50-2.50% biodegradability-enabling additive,
   0.50-1.50% zinc oxide,
   0.50-0.80% stearic acid,
   0.05-0.15% diphynyl guanidine,
   0.10-0.30% dibenzothiazole disulfide,
   0.50-0.80% benzothiazole sulfonamide, and
   1.50-3.50% sulphur.

15. The method according to claim 13, wherein mixing is performed at a temperature between 110 and 120° C.

16. The method according to claim 13, wherein the extruded portion has weight between 22 and 28 g and wherein the temperature of during extrusion is smaller than 110° C.

17. The method according to claim 13, wherein the curing mold temperature during forming of the half shell in the mold amounts to 155 to 170° C., and wherein curing takes 90 to 110 s.

18. The method according to claim 13, wherein the edges of the half shells are buffed before assembling the core.

19. The method according to claim 13, wherein the two half shells are attached to each other by means of adhesive.

20. The method according to claim 13, a) wherein assembling the core is performed in a curing mold having a temperature of 150 to 170° C., and wherein curing takes 110 to 130 s; and b) wherein the core is inflated to a pressure between 18 and 20 psi.

* * * * *